United States Patent [19]

Bovenzi et al.

[11] Patent Number: 5,502,524
[45] Date of Patent: Mar. 26, 1996

[54] APERTURE/SHUTTER MECHANISM WITH DAMPING MEMBER

[75] Inventors: Robert A. Bovenzi, Rochester; Jean F. Depatie, Albion; Michael D. Dunn, Rochester, all of N.Y.

[73] Assignee: Eastman Kodak Company, Rochester, N.Y.

[21] Appl. No.: 144,171

[22] Filed: Oct. 27, 1993

[51] Int. Cl.⁶ .............................. G03B 9/08; G03B 9/58
[52] U.S. Cl. ..................... 354/230; 354/252; 354/256
[58] Field of Search ................................ 354/226, 230, 354/236, 252, 256, 250

[56] References Cited

U.S. PATENT DOCUMENTS

| | | | |
|---|---|---|---|
| 3,614,919 | 10/1971 | Douglas | 95/10 C |
| 3,664,251 | 5/1972 | Vincent | 95/59 |
| 3,847,476 | 11/1974 | Onda et al. | 354/252 |
| 3,852,786 | 12/1974 | Onda et al. | 354/252 |
| 3,871,012 | 3/1975 | Haraguchi | 354/246 |
| 4,054,892 | 10/1977 | Nakagawa et al. | 354/252 |
| 4,327,977 | 5/1982 | Starp | 354/252 |
| 4,408,858 | 10/1983 | Lee | 354/234 |
| 4,623,233 | 11/1986 | Yamada et al. | 354/229 |
| 4,829,329 | 5/1989 | Toyoda et al. | 354/252 |
| 4,847,649 | 7/1989 | Toyoda et al. | 354/252 |
| 5,173,728 | 12/1992 | SanGregory et al. | 354/234.1 |

FOREIGN PATENT DOCUMENTS

| | | | |
|---|---|---|---|
| 87724 | 11/1972 | Germany | G03B 9/10 |
| 1963086 | 9/1977 | Germany . | |

Primary Examiner—Michael L. Gellner
Assistant Examiner—Nicholas J. Tuccillo
Attorney, Agent, or Firm—David A. Howley

[57] ABSTRACT

An aperture/shutter mechanism includes one or more shutter blades moveable to various aperture openings between a fully open and closed position. At least one damping member has a damping surface in continuous frictional contact with at least a portion of a surface of the one or more shutter blades to substantially prevent oscillation of the one or more shutter blades during movement to the various aperture openings between the fully open and closed positions.

4 Claims, 7 Drawing Sheets

APERTURE/SHUTTER MECHANISM WITH DAMPING MEMBER

CROSS-REFERENCE TO RELATED APPLICATIONS

The invention is related to application Ser. No. 07/995,241 filed in the names of Depatie et al. on Dec. 22, 1992, Ser. No. 08/042,434 filed in the name of Fox on Apr. 5, 1993 and Ser. No. 08/144,171 filed in the names of Depatie et al. on Oct. 7, 1993, both of which are assigned to the assignee of the present Application.

FIELD OF THE INVENTION

This invention relates generally to the field of photography, and, more particularly, to an aperture/shutter mechanism having a damping member which substantially prevents oscillation of shutter blades in the shutter mechanism.

BACKGROUND OF THE INVENTION

Stepper motor driven aperture/shutter systems have been notorious for the shutter blades oscillating, under damped behavior, when opened to a desired aperture position. Much has been done to damp this oscillating motion, such as the use of elaborate controls for driving the stepper motor. However, the use of elaborate motor controls is expensive and complicates the operation of the aperture/shutter system.

Another method of addressing the oscillating motion of shutter blades is disclosed in U.S. Pat. No. 3,852,786, issued in the names of Onda et al. on Dec. 3, 1974. The Onda patent discloses a shutter assembly having a plurality of shutter blades divided in a shutter-opening blade group and a shutter-closing blade group. A shutter actuating mechanism independently actuates both groups of shutter blades to effect opening and closing of a shutter aperture. A flexible spring plate having a series of protuberances thereon is disposed along the path of travel of the shutter blades. As each blade group nears the end of its working stroke, the shutter blades collide with selected ones of the protuberances to effect flexing of the spring plate to cause movement of other ones of the protuberances into firm frictional engagement with the shutter blades. Consequently, the shutter blades are pressed together to absorb the kinetic energy of the shutter blades and effectively dampen their rapid movement.

PROBLEMS TO BE SOLVED BY THE INVENTION

In aperture/shutter assemblies wherein the shutter blades can be opened to a number of different positions to create different aperture sizes, oscillation of the shutter blades will occur at each of the different positions. This oscillation causes an inaccurate exposure of a light sensitive material, resulting in image capture degradation.

The shutter mechanism disclosed in the Onda patent has protuberances which only contact the shutter blades in their fully open or fully closed position and therefore could not prevent oscillation of the shutter blades if stopped in various positions between the fully open and fully closed positions.

In the shutter assembly disclosed in the Onda patent, the protuberances contact a relatively small area of the shutter blades. As a result, the pressure as well as the frictional force on the area of the shutter blades contacted by the protuberances is high. With repeated shutter use, the area of the shutter blades contacted by the protuberances will wear out. Light can then bypass the worn out portion of the shutter blades resulting in degraded image capture.

A further problem with the Onda shutter assembly is that flexible spring plate 9 is not flat, thereby requiring a certain minimum distance to be maintained between base plate 1 and press plate 10. This increases the size of the aperture/shutter assembly, thereby detracting from the desirable goal of reducing the overall size of the image capture device, such as a camera, in which the aperture/shutter assembly is incorporated.

SUMMARY OF THE INVENTION

According to one aspect of the invention, an aperture/shutter mechanism includes one or more shutter blades moveable between an open position and a closed position. At least one damping member has a damping surface in continuous frictional contact with at least a portion of a surface of the one or more shutter blades to substantially prevent oscillation of the one or more shutter blades during movement between the open and closed positions.

According to another aspect of the invention, the damping member's damping surface is in continuous frictional contact with a substantial portion of a surface of the one or more shutter blades to substantially prevent oscillation of the one or more shutter blades during movement between the open and closed positions.

ADVANTAGEOUS EFFECTS OF THE PREFERRED EMBODIMENT

Rather than being in noncontinuous contact with the shutter blades, the damping member of the present invention is in constant contact with at least a portion of the shutter blades, allowing the shutter blades to be moved to any position between their open and closed position while still substantially preventing oscillation of the shutter blades.

Further, because the damping member preferably contacts a substantial portion of a surface of the shutter blades, the frictional force on the blades is spread out over a large area. Consequently, the shutter blades will not be worn through in the areas contacted by the damping member. As a result, the aperture/shutter assembly is more robust and will lend itself to creating high quality images for a long time.

The damping member(s) are preferably flat and have a substantially uniform thickness of about 0.08 millimeters, allowing the size of the aperture/shutter mechanism to be reduced. As a result, the overall size of the image capture device in which the aperture/shutter mechanism is incorporated can be reduced.

DETAILED DESCRIPTION OF THE INVENTION

Figure 1:
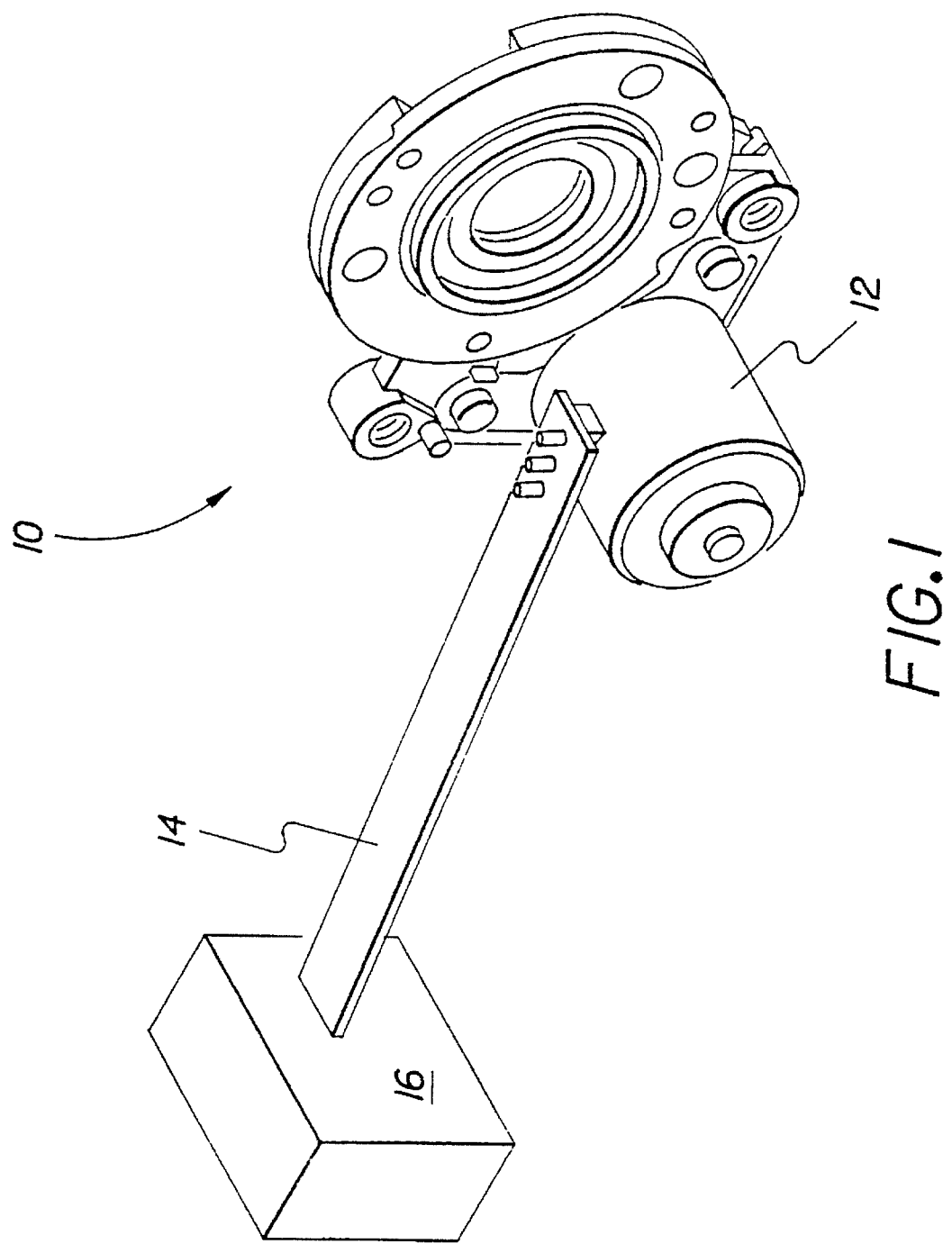
FIG. 1 is a perspective view of an aperture/shutter mechanism.

Referring now to the drawings, FIG. 1 shows an aperture/shutter mechanism designated generally by the reference numeral 10. The aperture/shutter mechanism includes a stepper motor 12 and a flex circuit 14 attached to stepper motor 12. Flex circuit 14 is connected to a microprocessor 16 which controls operation of the stepper motor via the flex circuit.

Figure 2:
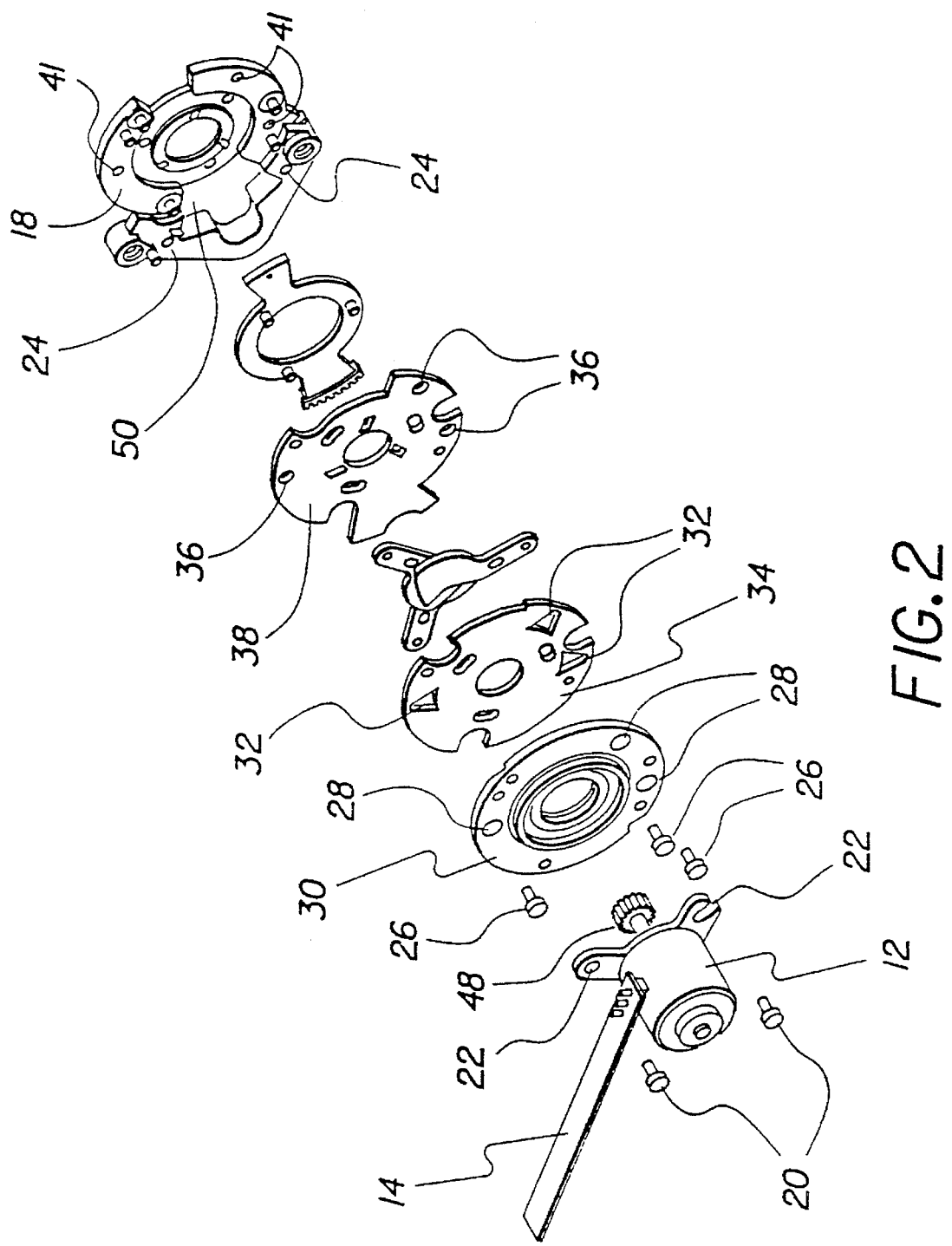
FIG. 2 is an exploded perspective view of the aperture/shutter mechanism of FIG. 1.
Figure 3:
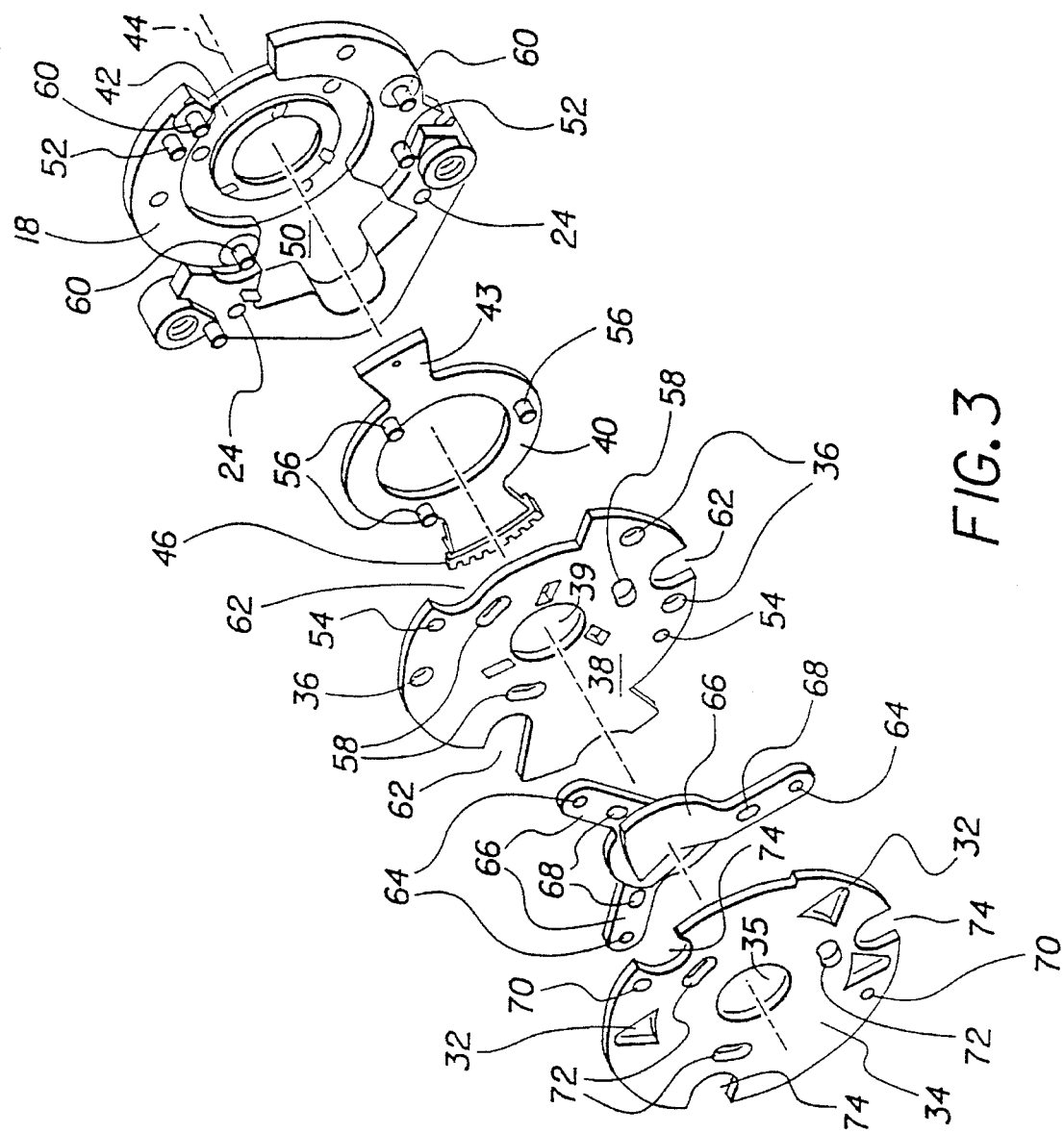
FIG. 3 is an exploded perspective view of a portion of FIG. 2.

Turning now to FIGS. 2 and 3, stepper motor 12 is secured to a base plate 18 by a pair of self-tapping screws 20. Screws 20 pass through a pair of flange holes 22 on the stepper motor and engage a pair of holes 24, in base plate 18, which are adapted to receive screws 20. The remainder of the aperture/shutter mechanism is held together by three self-tapping screws 26 which pass through three holes 28 in a cover plate 30. Screws 26 next pass through three triangular shaped openings 32 in a first damping member 34 and three circular holes 36 in a second damping member 38. Finally, screws 26 engage holes 41 in base plate 18 to secure the entire assembly together.

Referring to FIG. 3, a shutter blade actuator 40 resides in a circular recess 42 formed in base plate 18. As such, the only degree of freedom actuator 40 has is to rotate about an optical axis 44. A gear rack 46 on actuator 40 is engaged by a gear 48 driven by stepper motor 12 (see FIG. 2). Gear 48 extends through an opening 50 in base plate 18 to engage gear rack 46. When stepper motor 12 rotates gear 48, actuator 40 is rotated about optical axis 44. An extension 43 of actuator 40 acts as a counter-balance to gear rack 46.

Second damping member 38 overlies actuator 40. A pair of pins 52 on base plate 18 protrude through a pair of holes 54 in second damping member 38 to properly position the second damping member and prevent it from rotating about the optical axis. Three driver pins 56 on actuator 40 extend through three elongated slots 58 in second damping member 38. When actuator 40 is rotated, driver pins 56 move within slots 58 without rotating the second damping member.

Three pivot pins 60 on base plate 18 protrude through openings 62 in second damping member 38. Pivot pins 60 pass respectively through three holes 64 respectively located in each of three shutter blades 66. Shutter blades 66 are free to pivot about pins 60. Driver pins 56 protrude respectively through three slots 68 located respectively in each of the shutter blades 66. Slots 68 are oriented such that when stepper motor 12 rotates actuator 40 about optical axis 44, driver pins interact with slots 68 to pivot shutter blades 66 about pivot pins 60. The result is that the shutter blades are moved between a closed position shown in FIG. 4 and various open positions shown in FIGS. 5 and 6.

First damping member 34 has a pair of holes 70 through which pins 52 protrude. Pins 52 prevent the first damping member from rotating about the optical axis. Driver pins 56 protrude respectively through three slots 72 in first damping member 34. Slots 72 allow driver pins 56 to rotate about optical axis 44 without rotating first damping member 34. Pivot pins 60 on base plate 18 extend respectively through three openings 74 located about the periphery of first damping member 34.

Damping members 34 and 38 each have an aperture, respectively designated 35 and 39, aligned with optical axis 44 and various sized apertures formed by shutter blades 66 when the shutter blades are in various open positions. As such, apertures 35 and 39 allow light to pass towards a photosensitive medium. Aperture 35 is slightly larger than aperture 39. When shutter blades 66 are in their fully open position (FIG. 6), aperture 39 defines the largest opening through which light can pass towards a photosensitive medium. Of course, aperture 35 could be used to define the largest opening instead of aperture 39.

Shutter blades 66 and first and second damping members 34, 38 are preferably (1) made of polyethylene terepthalate which is opaque and (2) flat. The damping members preferably have a substantially uniform thickness of 0.08 millimeters. When the aperture/shutter mechanism is assembled, shutter blades 66 are sandwiched between the first and second damping members. The first and second damping members each have a damping surface in constant frictional contact with at least a portion of each of the shutter blades. The frictional contact substantially prevents oscillation of the shutter blades throughout their entire range of movement and, most importantly, when the shutter blades are stopped at various open positions. By varying the thickness of the damping members and the size of the damping surfaces, the amount of damping can be fine tuned.

Figure 4:
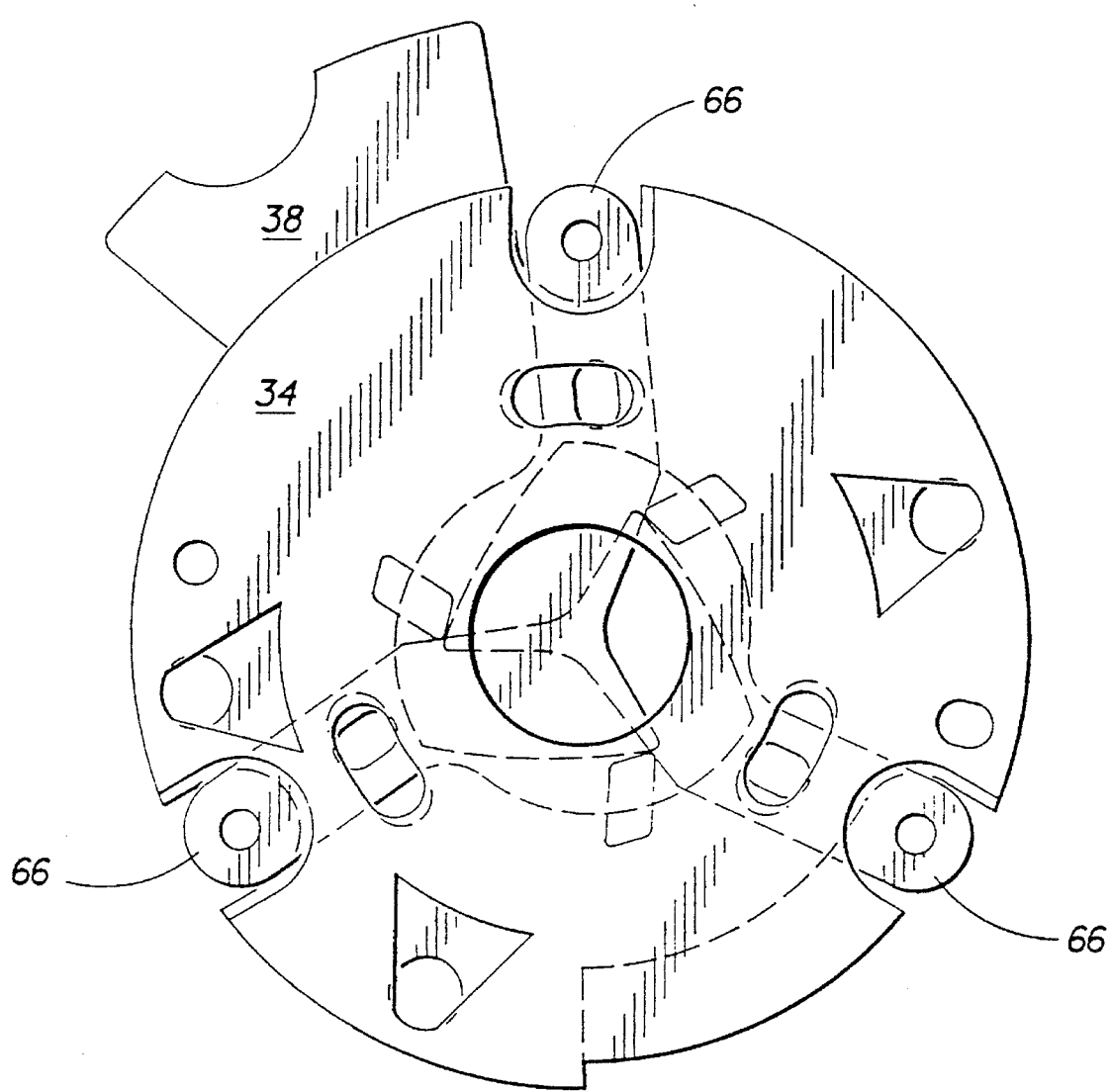
FIGS. 4–6 are front views of a portion of the aperture/shutter mechanism of FIG. 1, showing the shutter blades in various positions.
Figure 5:
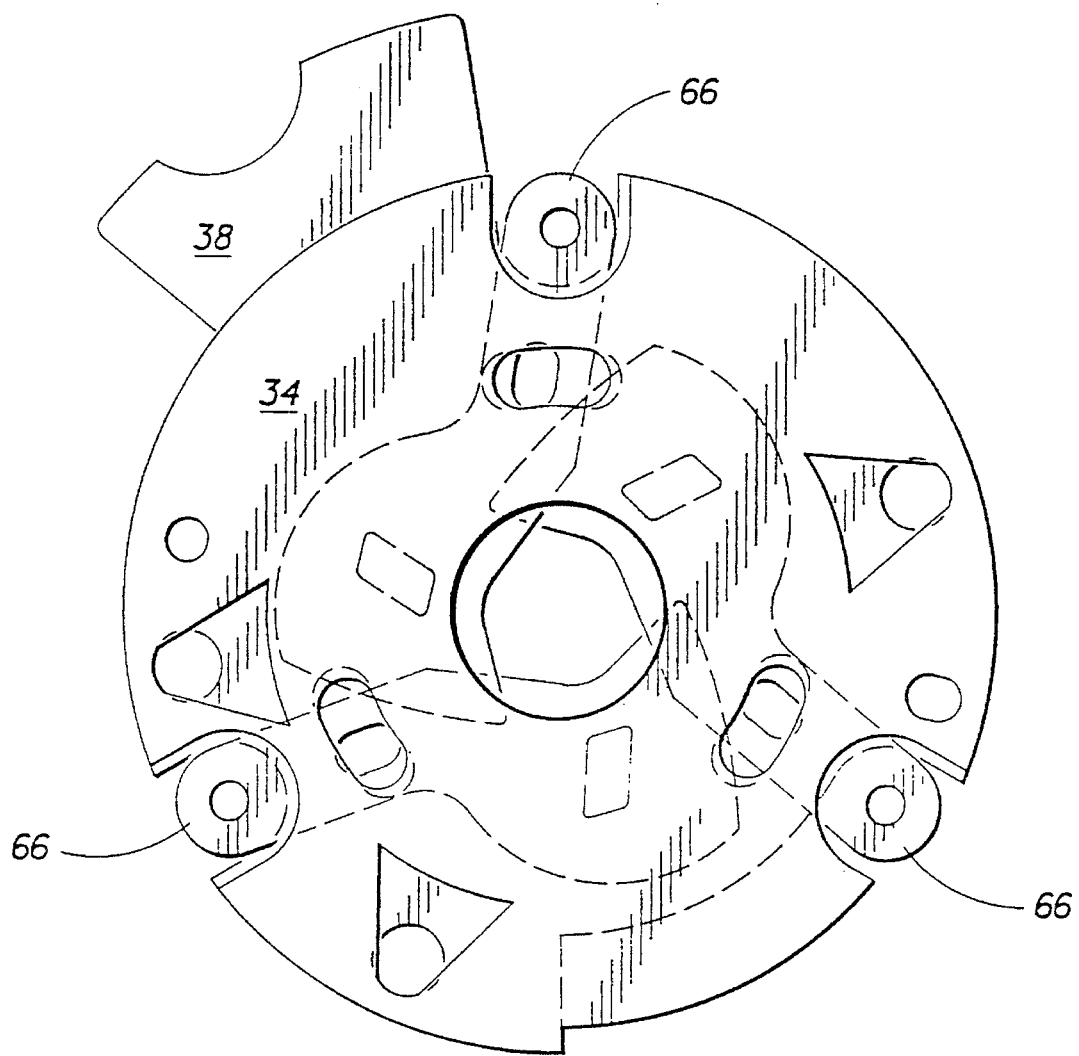
Figure 6:
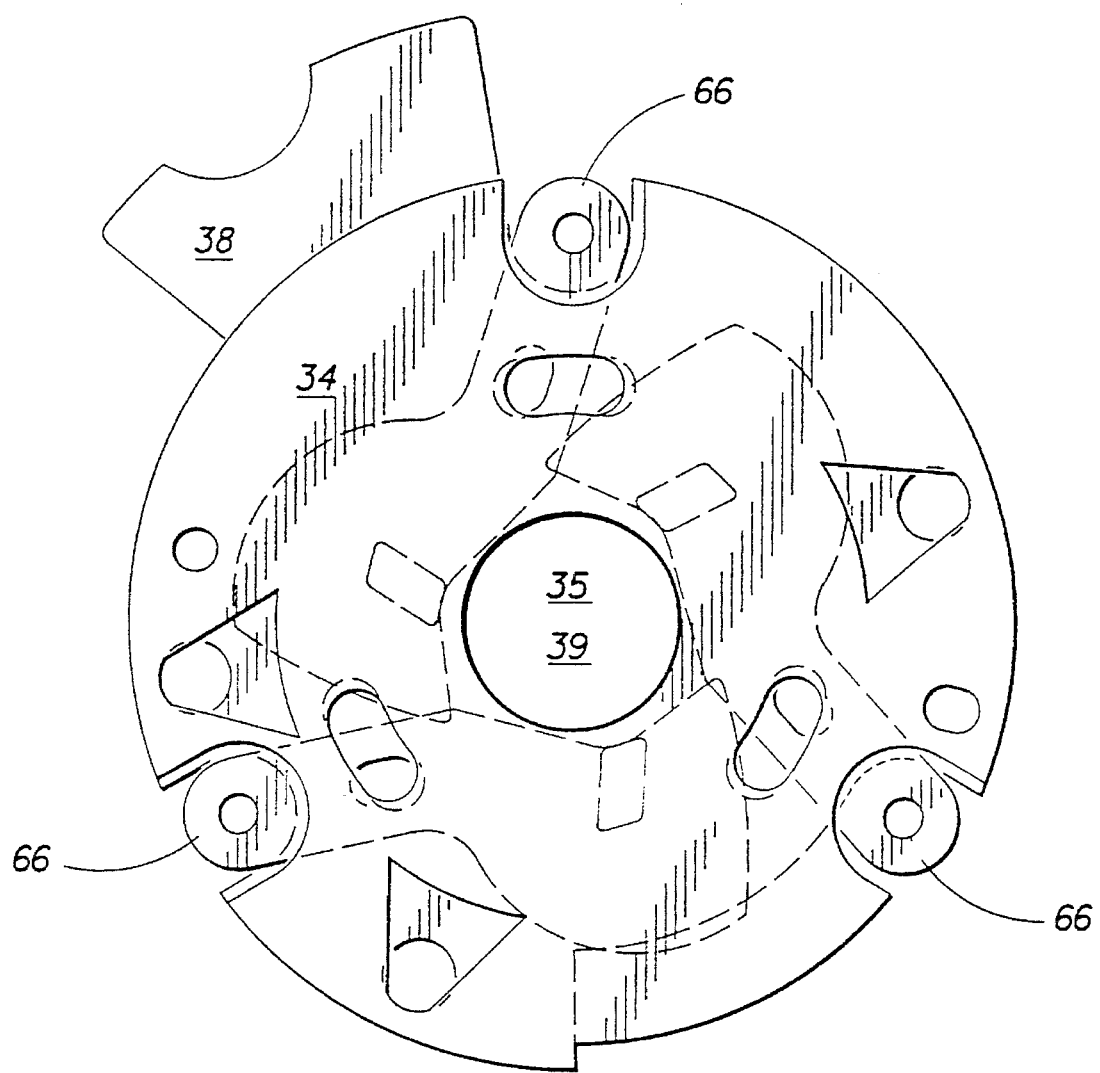

FIGS. 4–6 show shutter blades 66 in a various positions. In FIG. 4 the shutter blades are in a closed position, thereby preventing light from proceeding towards a photosensitive material such as photographic film. In FIG. 5 shutter blades 66 have been opened to an intermediate aperture position which allows some light to proceed towards a photosensitive material. When the shutter blades are stopped at this intermediate position, the present invention substantially prevents oscillation of the shutter blades, resulting in a more accurate exposure of the photosensitive material. In FIG. 6 shutter blades 66 have been opened completely. In this case, aperture 39 defines the aperture through which light passes towards a photosensitive medium. Because the damping members contact a substantial portion of a surface of the shutter blades, the frictional force on the blades is spread out over a large area of the blades.

Figure 7B:
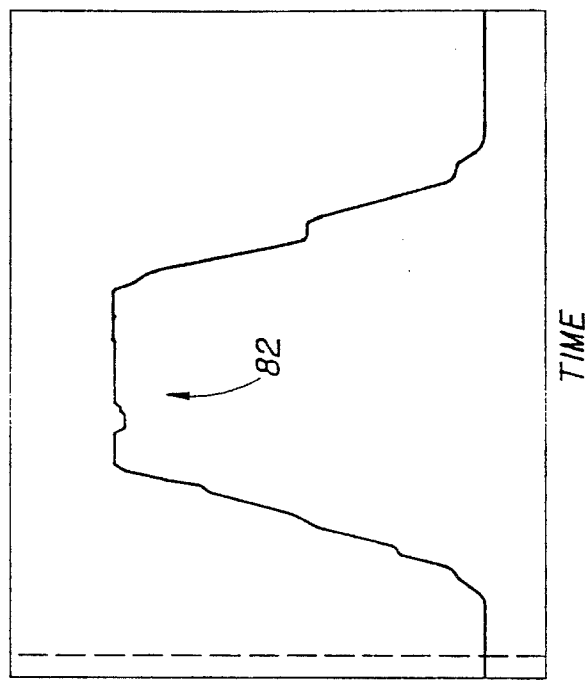
FIG. 7 is a plot of the shutter blade aperture opening against time both with and without damping members.
Figure 7A:
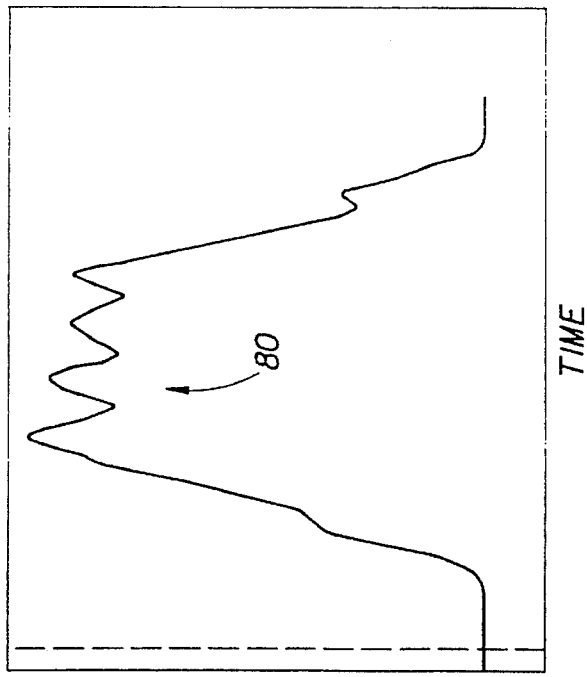

FIG. 7 is a plot of the shutter blade aperture opening versus time both with and without damping member 34. In plot A where damping member 34 is not used and damping member 38 is used, it can be seen at 80 that the shutter blades are oscillating in their open position. In plot B where both damping members are used, it can be seen at 82 that oscillation of the shutter blades has been substantially prevented. It should be noted that while the use of one damping member reduces oscillation of the shutter blades, using both damping members more effectively prevents shutter blade oscillation.

Because the damping members are in continuous frictional contact with the shutter blades, oscillation of the shutter blades is substantially prevented when the shutter blades are in a closed position, a fully opened position or any number of intermediate positions between the fully open and closed positions. By using the damping members of the present invention, a more accurate exposure of a photosensitive medium can be obtained, thereby enhancing image quality.

The invention has been described with reference to a preferred embodiment. However, it will be appreciated that variations and modifications can be effected by a person of ordinary skill in the art without departing from the scope of the invention.

PARTS LIST FOR FIGS. 1–7

| | |
|---|---|
| 10 Aperture/Shutter Mechanism | 42 Circular Recess |
| 12 Stepper Motor | 44 Optical Axis |

-continued

PARTS LIST FOR FIGS. 1–7

| | |
|---|---|
| 14 Flex Circuit | 46 Gear Rack |
| 16 Microprocessor | 48 Gear |
| 18 Base Plate | 50 Base Plate Opening |
| 20 Self-tapping Screws | 52 Pins |
| 22 Motor Flange Holes | 54 Holes |
| 24 Holes | 56 Driver Pins |
| 26 Self-tapping Screws | 58 Elongated Slots |
| 28 Holes | 60 Pivot Pins |
| 30 Cover Plate | 62 Openings |
| 32 Triangular Shaped Openings | 64 Holes |
| 34 First Damping member | 66 Shutter Blades |
| 35 Aperture | 68 Slots |
| 36 Circular Holes | 70 Holes |
| 38 Second Damping Member | 72 Slots |
| 39 Aperture | 74 Openings |
| 40 Shutter Blade Actuator | 80 Plot |
| 41 Holes | 82 Plot |

What is claimed is:

1. An aperture/shutter mechanism comprising one or more shutter blades moveable between an open position and a closed position, is characterized by:

at least one damping member having a damping surface in continuous frictional contact with at least a portion of a surface of said one or more shutter blades to reduce oscillation of said one or more shutter blades during movement between said open and closed positions, wherein said one or more shutter blades define an aperture when moved to said open position, and said damping member has an aperture aligned with said aperture defined by said one or more shutter blades.

2. The aperture/shutter mechanism of claim 1, wherein said at least one damping member includes a pair of said damping members each having a damping surface in continuous frictional contact with at least a portion of respective opposed surfaces of said one or more shutter blades in a manner sandwiching said one or more shutter blades between said damping members.

3. The aperture/shutter mechanism of claim 1, wherein said damping member is flat and has a uniform thickness of about 0.08 millimeters.

4. The aperture/shutter mechanism of claim 1, wherein said damping member's damping surface is in continuous frictional contact with a substantial portion of a surface of said one or more shutter blades.

* * * * *